(12) United States Patent
Karandikar et al.

(10) Patent No.: US 8,474,362 B1
(45) Date of Patent: Jul. 2, 2013

(54) DIAMOND-REINFORCED COMPOSITE MATERIALS AND ARTICLES, AND METHODS FOR MAKING SAME

(75) Inventors: Prashant G. Karandikar, Avondale, PA (US); Sam Salamone, Philadelphia, PA (US); Allyn L. McCormick, Lewes, DE (US); Michael K. Aghajanian, Newark, DE (US); Glen Evans, Newark, DE (US)

(73) Assignee: M Cubed Technologies, Inc., Trumbull, CT (US)

( * ) Notice: Subject to any disclaimer, the term of this patent is extended or adjusted under 35 U.S.C. 154(b) by 39 days.

(21) Appl. No.: 12/313,372

(22) Filed: Nov. 19, 2008

Related U.S. Application Data

(60) Provisional application No. 61/003,811, filed on Nov. 20, 2007.

(51) Int. Cl.
*F41H 5/04* (2006.01)

(52) U.S. Cl.
USPC ............................................. 89/36.02; 89/907

(58) Field of Classification Search
USPC ..................................... 89/36.02, 36.17, 907
See application file for complete search history.

(56) References Cited

U.S. PATENT DOCUMENTS

| | | | |
|---|---|---|---|
| 3,205,043 A | 9/1965 | Taylor | |
| 3,275,722 A | 9/1966 | Popper | |
| 3,431,818 A * | 3/1969 | King ............................ | 89/36.02 |
| 3,495,939 A | 2/1970 | Forrest | |
| 3,702,593 A * | 11/1972 | Fine ................................ | 109/80 |
| 3,725,015 A | 4/1973 | Weaver | |
| 3,796,564 A | 3/1974 | Taylor et al. | |
| 3,857,744 A | 12/1974 | Moss | |
| 3,859,399 A | 1/1975 | Bailey et al. | |
| 4,220,455 A | 9/1980 | St. Pierre et al. | |
| 4,241,135 A * | 12/1980 | Lee et al. ....................... | 428/332 |
| 4,353,953 A | 10/1982 | Morelock | |
| 4,453,951 A | 6/1984 | Ohno | |
| 5,221,807 A * | 6/1993 | Vives ........................... | 89/36.02 |
| 6,447,852 B1 | 9/2002 | Gordeev et al. | |
| 6,609,452 B1 | 8/2003 | McCormick et al. | |
| 6,955,112 B1 | 10/2005 | Adams et al. | |
| 2007/0293108 A1 * | 12/2007 | Kubota ........................... | 442/179 |

FOREIGN PATENT DOCUMENTS

GB  1 595 517  * 8/1981

OTHER PUBLICATIONS

Dennis J. Viechnicki, Michael J. Slavin and Morton I. Kliman, "Development and Current Status of Armor Ceramics". *Ceramic Bulletin*, vol. 70, No. 6, pp. 1035-1039 (1991).

* cited by examiner

*Primary Examiner* — Stephen M Johnson
(74) *Attorney, Agent, or Firm* — Law Office of Jeffrey R. Ramberg

(57) ABSTRACT

A diamond-reinforced SiC ceramic composite material and shaped article. The addition of diamond to the microstructure greatly enhances properties such as hardness and Young's modulus. Such a composite material has considerable promise as an armor material. In particular, significant increases in ballistic performance can be achieved versus a non-diamond-containing composite, particularly versus the M993 threat. Reaction bonded silicon carbide (RBSC) ceramics with 7% diamond were shown to offer ballistic performance levels that matched the best commercial ceramics tested on the program.

9 Claims, 9 Drawing Sheets

DIAMOND-REINFORCED COMPOSITE MATERIALS AND ARTICLES, AND METHODS FOR MAKING SAME

CROSS-REFERENCE TO RELATED APPLICATIONS

This patent document claims the benefit of U.S. Provisional Patent Application No. 61/003,811, filed on Nov. 20, 2007. Except for "Discussion of related art" and "OBJECTS OF THE INVENTION" sections, the entire contents of this provisional patent application are incorporated herein by reference.

STATEMENT REGARDING FEDERALLY SUPPORT RESEARCH

This invention was made with support from Contract No. W911QY-06-0041 from the US Army Natick Soldier RD&E Center. Accordingly, the United States government has certain rights in this invention.

BACKGROUND OF THE INVENTION

1. Field of the Invention

The present invention relates to composite materials containing diamond. The instant invention also relates to applications of such composite materials, particularly as armors for defeating ballistic projectiles.

2. Introduction 2.1 Goals and Approach:

Current military personnel armor systems consist of two primary components, namely a vest (often referred to as "soft armor") and plates (often referred to as "hard armor") that fit within pockets in the vest. The plate portion of the system is most typically a lamination of a ceramic tile and a rigid fiber-reinforced polymer backing. The purpose of the ceramic tile is to damage the bullet, and the purpose of the fiber-reinforced polymer backing is to support the ceramic and to catch fragments of the damaged bullet. The microstructure and properties of the ceramic tile can greatly affect the performance of the system with respect to single-shot performance, multi-hit performance and field durability.

2.2 Executive Summary:

The present research that is the basis for this patent document was part of a larger series of US government funded research programs. The primary goal of these programs was to develop enhanced personnel armor systems by improving the hard component in the assembly. Key improvement needs were increased durability, increased mass efficiency, and the ability to defeat more aggressive threats. Tool steel-tipped threats were studied, as well as the even more aggressive armor piercing (AP) threats. The present research project was solely focused on the "tile" in the armor system. Thus, a constant backing system (armor design) was used for all testing.

The approach used to achieve the objective was:
Conduct materials development/optimization experiments using 4-inch (100 mm) square plates as the test size. Experiments evaluated all appropriate "tile" materials.
Evaluate 4-inch (100 mm) square tiles for:
Microstructure, composition and properties.
Single-shot ballistic performance
In parallel, evaluate microstructure, properties and ballistic performance of current commercial personnel armor tile materials. Results obtained on these materials provide a benchmark for assessing success on the program.

2.3 Projectiles and Phase Transformations:

To provide comparative information, various projectile cores were obtained and examined for microstructure and hardness. Results are provided in Table 1 and FIG. 1. Referring to FIG. 1 in particular, the left hand micrograph is of a 7.62 mm "M993" round, and the right-hand micrograph is of a 7.62 mm "New Lenox" test round. In light of the work of Viechnicki et al. [1], where it was stated that an effective armor ceramic must be harder than the projectile, it is important to use the results in Table 1 as a guide when conducting materials development work. That is, one must ensure that the material being developed is harder than the threat of interest.

TABLE 1

Properties of Projectiles

| Projectile | Core Composition | Density, g/cc | Hardness*, kg/mm$^2$ (Knoop Scale, 500 g load) | Hardness*, kg/mm$^2$ (Knoop Scale, 2 kg load) |
|---|---|---|---|---|
| 7.62 mm LPS | Soft Steel | 7.8 | 202 ± 10 | Out of Range |
| 20 mm FSP | Soft Steel | 7.8 | 394 ± 18 | Out of Range |
| 7.62 mm APM2 | Tool Steel | 7.8 | 739 ± 9 | 720 ± 5 |
| 14.5 mm BS-41 | WC/Co | 14.8 | 1503 ± 63 | 1434 ± 20 |
| 7.62 mm M993 | WC/Co | 14.8 | 1278 ± 24 | 1185 ± 44 |
| 7.62 mm New Lenox Test Round | WC/Co | 14.8 | 1490 ± 82 | 1410 ± 17 |

*Testing performed on a Shimadzu HMV-2000 microhardness tester. Measurements taken at both 500 g and 2 kg to ease comparison with data in literature.

In addition to hardness concerns, one must be aware of possible pressure induced phase transformations when developing hard armor materials. High density projectiles, such as WC/Co, a composite of tungsten carbide and cobalt metal, commonly referred to as "cemented carbide") apply very high pressure upon impact. To effectively defeat such projectiles, the armor material must be capable of sustaining the pressure load without a phase transformation. This phase transformation-like effect led to a decrease in ballistic performance. Information in the literature suggests that Si and $B_4C$ will degrade when exposed to the high pressures applied by WC/Co projectiles upon impact. Specifically, as shown in Tables 2 and 3, the pressure applied by a WC/Co projectile upon impact is higher than the threshold pressure at which Si and $B_4C$ fail. Silicon fails via a pressure induced phase transformation [2], and $B_4C$ fails via an "amorphization" [3].

TABLE 2

Pressures Applied at Impact by 7.62 mm Projectiles Constructed of Tool Steel and WC/Co

| Projectile Type | Projectile Construction Material | Pressure Applied by Projectile During Muzzle Velocity Impact (GPa) |
|---|---|---|
| 7.62 × 54 R mm B32 | Tool Steel | ~15 [ref. 4] |
| 7.62 × 51 mm NATO FFV | WC/Co | ~23 [ref. 4] |

TABLE 3

Threshold Pressures for Phase Transformations in Si and $B_4C$

| Material | Pressure at Which Phase Transformation Occurs (GPa) | Reference |
|---|---|---|
| Si | 9-16 | 2 |
| $B_4C$ | ~20 | 3 |

To yield desired performance levels versus threats that apply a high pressure load, the Phase II research focused on reducing or eliminating the Si and $B_4C$ contents of reaction bonded ceramics.

2.3 Ballistic Testing:

Ballistic testing was conducted using two different 7.62 mm armor piercing (AP) threats. One threat, the APM2, has a core of tool steel. As a result of its modest density, the pressure it applies at impact is insufficient to cause phase transformation of Si and/or amorphization of $B_4C$. The second threat, M993, has a core of WC/Co. At muzzle velocity, this high density projectile applies sufficient pressure to promote phase transformation and/or amorphization of Si and $B_4C$. An optimized material that successfully defeats both of these threats will have broad utility in armor applications.

Materials screening ballistic tests were conducted on 100 mm×100 mm (4 inch square) ceramic tiles (single shot testing). These tests generated a $V_{50}$ result in accordance with MIL-STD-662 (six or more tiles per test set). The tiles were backed with a polymer composite to yield a "system". For all tests, the areal density of the ceramic tile and the polymer backing were held constant.

2.4 Other Test Methods:

In addition to ballistic test data, various physical and mechanical property results are presented within the following sections. A summary of test methods used to collect the data are provided in Table 4. In addition to these tests, various specialized tests are used throughout the R&D activities. When appropriate, these tests are described within the text.

TABLE 4

Test Methods Utilized for Physical and Mechanical Properties

| Property | Reference | Test Method |
|---|---|---|
| Density | ASTM C135-86 | Water Immersion |
| Young's Modulus | ASTM E494-95 | Ultrasonic Velocity |
| Phase Fractions | — | Quantitative Image Analysis (using Clemex VisionLite) |
| Composition (compounds) | — | X-Ray Diffraction (XRD) |
| Composition (elements) | — | Glow Discharge Mass Spectrometry (GDMS) |
| Knoop Hardness | ASTM C1326-99 | Diamond Indentation |
| Flexural Strength | ASTM C1161-90 | Four-Point Bend Test |
| Fracture Toughness | Munz et al. [7] | Four-Point Bend Chevron Notch Test |

Unless stated otherwise, the Knoop hardness testing was performed with a 2 kg load. This follows the Army's recommendation for hardness characterization of armor ceramics [8].

2.5 Reaction Bonded Ceramics, including those for Armor Applications:

The production of reaction bonded ceramics has been described elsewhere in detail [5, 6]. In short, the process consists of two primary steps. First, a porous mass or preform of ceramic particles (e.g., SiC or $B_4C$) plus carbon is fabricated. Second, the preform is reactively infiltrated with molten Si. During the infiltration process, the Si and carbon react to form SiC, which bonds the ceramic particles into an interconnected network (hence the name reaction bonding). The process is shown schematically in FIG. 2.

The body thus formed features the porous mass material, typically silicon carbide, distributed throughout the in-situ silicon carbide formed from the chemical reaction. Typically, some infiltrant material remains in the infiltrated body, and distributed throughout. The process by which such "reaction bonded" ceramics or composites is made is called "reaction-bonding", although other terms have been used in the literature over the years to mean substantially the same thing. These terms include "reaction forming", "reaction sintering", and "self bonding".

A variation of the reaction bonding process is described in U.S. Pat. No. 3,951,587 to Alliegro et al. Here, it was discovered that molten silicon can spontaneously wick into a porous mass of silicon carbide without the need for elemental carbon to be present to react with the molten silicon, although the process may require somewhat higher temperatures than the reaction bonding process, and may still not be as robust. Many refer to the product resulting form this process as "siliconized SiC", and to the process by which it is made as "siliconizing.".

A primary feature of the reaction bonding process is that the pore space in the preform is filled by infiltration. Thus, nominally no volume change occurs during processing. This is very different when compared to the sintering and hot pressing processes where the pore space is closed by shrinkage of the part—typically 20% linear shrinkage. Because there is virtually no shrinkage, the reaction bonding process allows the production of large and complex shapes. Another feature of reaction bonded ceramics is the fact that molten Si, like water, expands upon solidification. Therefore, a finished reaction bonded ceramic is fully dense. Fully dense microstructures are desired in armor applications.

The microstructure and properties of M Cubed Technologies' currently fabricated reaction bonded silicon carbide, or "RBSC" (grade SSC-802) and reaction bonded boron carbide, or "RBBC" (grade RBBC-751) ceramics are provided below in FIG. 3, and Tables 5 and 6. These data, which are from actual production tiles, are used as a baseline to which results from experimental tiles made on the program are compared.

TABLE 5

Properties of M Cubed Technologies' Current Armor-Grade Reaction Bonded Silicon Carbide Ceramic (Grade SSC-802)

| Property | Result | Comments |
|---|---|---|
| Density (g/cc) | 3.00 ± 0.02 | SPC Data - population of >5,000 tiles |
| Young's Modulus (GPa) | 365 ± 3 | SPC Data - population of >5,000 tiles |
| Knoop 2 kg Hardness ($kg/mm^2$) | 1332 ± 116 | >10 Test Tiles |
| Flexural Strength (MPa) | 290 ± 25 | >10 Test Tiles |
| Fracture Toughness ($MPa-m^{1/2}$) | 4.0 ± 0.5 | >10 Test Tiles |
| Calculated Composition via Rule of Mixtures | Si Content: 23.9 vol. % SiC Content: 76.1 vol. % | |
| Quantitative XRD | Si: 16.7 wt. % (21.6 vol. %) SiC: 83.3 wt. % (78.4 vol. %) | |

TABLE 6

Properties of M Cubed Technologies'
Current Armor-Grade Reaction Bonded
Boron Carbide Ceramic (Grade RBBC-751)

| Property | Result | Comments |
| --- | --- | --- |
| Density (g/cc) | 2.56 ± 0.02 | SPC Data - population of >5,000 tiles |
| Young's Modulus (GPa) | 392 ± 6 | SPC Data - population of >5,000 tiles |
| Knoop 2 kg Hardness (kg/mm$^2$) | 1626 ± 127 | 100 Test Points |
| Flexural Strength (MPa) | 304 ± 35 | 35 Test Tiles |
| Fracture Toughness (MPa-m$^{1/2}$) | 4.5 ± 0.2 | 35 Test Tiles |
| Quantitative Image Analysis | Si Content: 13.4 vol. % Ceramic Content: 86.6 vol. % | |
| Quantitative XRD | Silicon: 13.3 wt. % Silicon Carbide: 8.7 wt. % Boron Carbide: 78.0 wt. % | |

In summary, reaction bonded ceramics offer many advantages for armor applications. They have attractive properties, can be formed in complex shapes, and can be economical to produce. However, issues do exist. For one, the hardness of the current form of reaction bonded SiC is below that of some potential WC/Co threats (discussed above). Thus, a hardness improvement is needed. In addition, as was previously stated, some phases in these ceramics are not suited to the dynamic, high pressure load applied by high density projectiles. Modification to the formulation is necessary.

3. Citation of Related Art: Composite Materials Containing Diamond

The following is a list, not guaranteed to be exhaustive or inclusive, of patents that may be relevant to the present invention:
U.S. Pat. No. 4,220,455 to St. Pierre et al.
U.S. Pat. No. 4,453,951 to Ohno
U.S. Pat. No. 7,008,672 to Gordeev et al.
U.S. Pat. No. 6,955,112 to Adams et al.

SUMMARY OF THE INVENTION

In accordance with the present invention, what is produced is a composite material containing diamond bodies, and optionally containing one or more filler materials, which may be substantially inert. One may manufacture such a composite material by a metal infiltration process such as a silicon infiltration process such as a reaction bonding process. The composite material functions well as an armor material. Thus, one may manufacture the composite material as a tile, and attach it to an appropriate backing material or layer, thereby forming an article having ballistic projectile-defeating qualities.

DETAILED DESCRIPTION OF THE INVENTION

Figure 1:
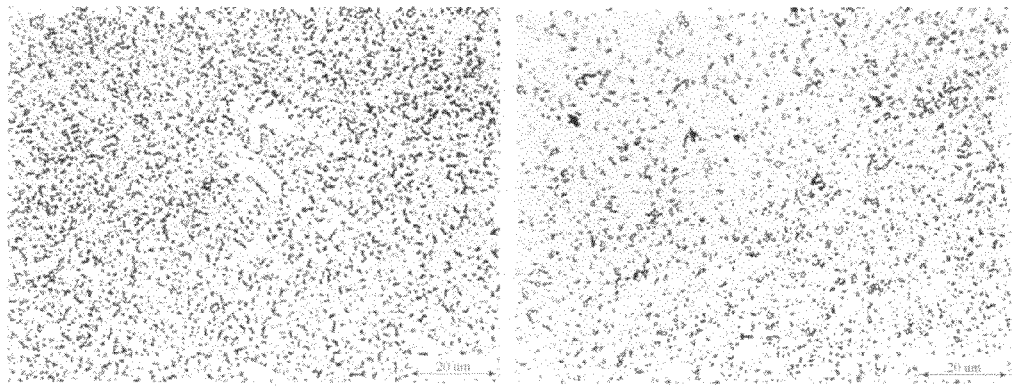
FIG. 1 is a pair of optical photomicrographs of two WC/Co cores: Left: 7.62 mm M993; Right: 7.62 mm "New Lenox" test round.
Figure 2:
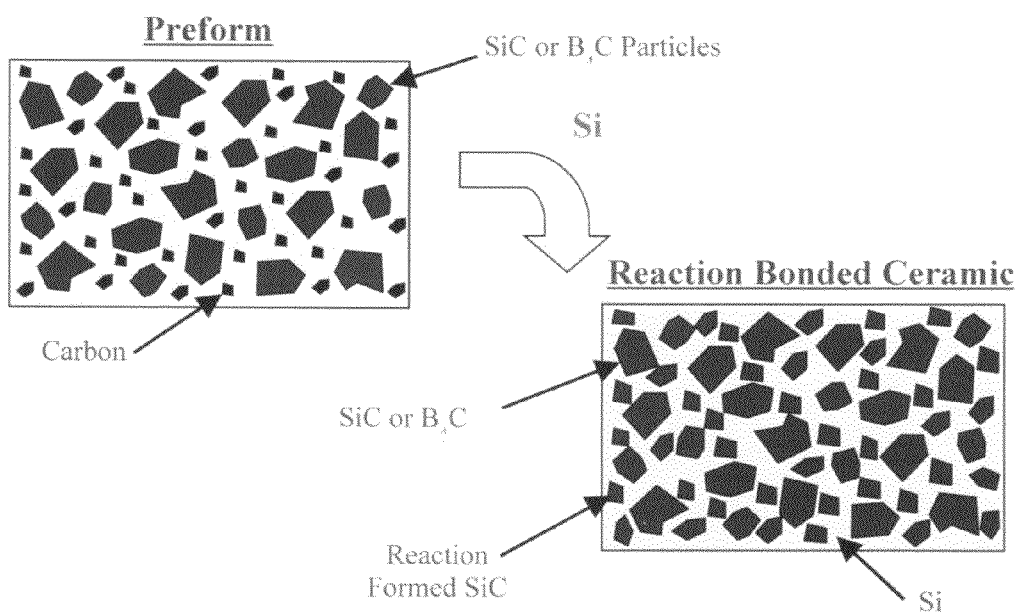
FIG. 2 is a schematic of the reaction bonding process.
Figure 3:
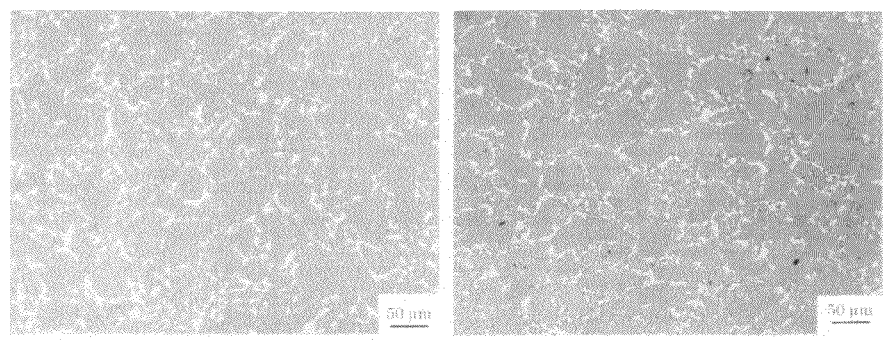
FIG. 3 is a pair of optical photomicrographs showing the microstructure of Currently Fielded Reaction Bonded Ceramics: Left: Reaction Bonded Silicon Carbide (Grade SSC-802); Right: Reaction Bonded Boron Carbide (Grade RBBC-751).

In an embodiment of the present invention, diamond-reinforced composite materials were produced by the above-discussed reaction bonding process. Specifically, the known reaction bonding process was altered or modified by adding diamond particulate to a perform designed or arranged for use in a reaction bonding system. Further, the diamond particles were protected from chemical reaction with the molten silicon by providing an intervening or coating layer of carbonaceous material on the diamond particles. One embodiment for providing such a layer is to soak the perform containing the diamond particles in a carbonaceous resin such as a phenolic resin, followed by drying the resin. The perform containing its protected diamond particles was then infiltrated with unalloyed elemental silicon. Other embodiments of the invention will be described below.

The particular compositions that were produced and tested were arrived at in a multi-step process. First, and due to the deleterious performance of boron carbide against heavier ballistic threats, it was decided to use a reaction bonding system that did not contain boron carbide. Next, due to the potential for reaction with molten silicon, the very fine (small) particle sizes of the diamond particulate were avoided. To best make a comparison to a baseline material, a size of diamond particulate closest to the 45 micron size of SiC particulate in M Cubed's grade SSC-802 reaction bonded silicon carbide system was chosen for one embodiment. The closest diamond particulate that was available was about 76 microns in size. Next, and because a RBSC system containing large SiC particles (about 310 microns in size) appeared promising from a ballistic performance standpoint, a diamond composite embodiment was selected featuring diamond particulate of approximately this size. This strategic thinking will be seen in the discussion that follows.

Properties of Constituents:

As discussed, predominant phases in armor-grade reaction bonded ceramics are $B_4C$, SiC and Si. For reference, properties for each of these constituents are provided in Table 7. (Note that hardness testing of the Si sample was difficult, as excessive damage and cracking occurred. Thus, the Si sample was measured with a low, 200 g load.)

TABLE 7

Properties of Constituents in Reaction Bonded Boron Carbide

|  | Si | SiC | $B_4C$ |
|---|---|---|---|
| Density (g/cc) | 2.33* | 3.21** | 2.52** |
| Young's Modulus (GPa) | 113* | 450** | 480** |
| Knoop Hardness ($kg/mm^2$) | 849*** (200 g load) | 1905**** (2 kg load) | 2069**** (2 kg load) |

*Reference [9] - ASM Metals Handbook: Desk Edition
**Reference [10] - ASM Engineered Materials Handbook: Ceramics and Glasses
***Measured by Applicants, Polycrystalline Si Sample, Shimadzu HMV-2000 hardness tester
****Measured by Applicants, Hot Pressed Samples, Shimadzu HMV-2000 hardness tester Diamond-Reinforced Ceramics:

Diamond is an extreme material. It possesses the highest hardness and bulk modulus of all materials. Table 8 compares a few of the properties of diamond to that of SiC. The traditional issues with diamond for use as an armor material include its high cost, its ultra-low CTE (i.e., cannot apply thick coatings without the formation of CTE mismatch cracks), and the fact that it is a meta-stable compound that decomposes above about 1450° C. (i.e., cannot be used in many ceramic fabrication processes). From a processing temperature standpoint, however, diamond is compatible with the relatively low processing temperatures for reaction bonded ceramics.

TABLE 8

Property Comparison of SiC and Diamond

|  | SiC | Diamond |
|---|---|---|
| Density (g/cc) | 3.21 | 3.52 |
| Young's Modulus (GPa) | 450 | 1050* |
| Knoop Hardness ($kg/mm^2$) | 1905 (2 kg load) | ~12,000** (.49 kg load) |

*Reference [13] - NIST SCD, Citation No. Z00225
**Reference [14] - Diamond and Related Materials Vol. 13, [10] pp. 1771-1776, 2004

In one of the Applicant's prior work with carbon fibers, one of the issues that arose with attempts to make carbon fiber-reinforced metal or ceramic composites by infiltration was that the silicon constituent of the infiltrant tends to react with the carbon fibers. (Strictly speaking, silicon is a semimetal or "metalloid", but in the context of the present disclosure, silicon will be considered a metal.) Diamond, being a form of carbon, is similarly expected to react chemically with silicon at elevated temperatures.

A technique according to the instant invention for protecting the diamond particles during the silicon infiltration step, is to coat the diamond particulate with, or embed them in, additional carbon prior to infiltration. Carbonaceous precursor materials such as pitch, phenolic resin, furfural alcohol, epoxy resin, etc. are acceptable choices in this regard. One embodiment of this technique for coating diamond particles is to stir in the diamond particulate into the liquid resin. Another embodiment would be to provide the diamond material to a porous mass or preform using standard techniques, and then soak the liquid resin into the porous mass. One may adjust viscosity as needed for the type of processing used by "thinning" the mixture with a low viscosity liquid into which the resin is soluble, e.g., an organic solvent.

After the mixture has been molded or cast or otherwise processed to the desired preform shape, any solvents that may have been added are removed, for example, by a drying operation, and then the carbonaceous substance (e.g., resin) is decomposed to carbon, first by curing or crosslinking the resin, and then with further heating, generally in a non-oxidizing environment, to pyrolyze the resin to drive off the non-carbon constituents of the resin, leaving substantially pure carbon behind as a residue. The residue carbon generally is porous, which may be important for a silicon infiltration operation. However, the pores are of such a size and amount and arrangement as to permit molten silicon infiltration into the pore space of the preform but not to permit complete chemical reaction of the silicon with carbon. Thus, it may be inevitable that some of the pyrolyzed carbon reacts with molten silicon during infiltration, but typically not all of this carbon is so reacted. That the pyrolyzed carbon limits the degree of reaction during infiltration of molten silicon is a manifestation of its protective function. It is not necessary that the pyrolyzed carbon be provided in multiple layers, or be in graphitized form for it to serve this chemical protective function.

Optionally, one may add a supplemental source of carbonaceous material not containing diamond to the developing preform that does contain diamond. Specifically, this supplemental carbon may be provided for the purpose of reacting with the silicon metal of the infiltrant to form in-situ silicon carbide and/or for further reducing the propensity for the silicon to react with the diamond constituent by saturating the silicon with carbon. One means of accomplishing this carbon addition to the preform is to soak the preform in a carbonaceous resin such as furfuryl alcohol, and then pyrolyze the resin in a non-oxidizing atmosphere to decompose the resin to essentially elemental carbon. This soak-and-pyrolyze step can be repeated one or more times to increase the amount of carbon and decrease the amount of pore space in the preform.

In another embodiment, it may be possible to coat or encapsulate diamond bodies with a silicon-containing polymer such as a polysilazane, for example, by stirring the diamond bodies into a polysilazane resin, or infiltrating bulk resin into a preform containing the diamond bodies.

In another technique for protecting the diamond bodies, it may be the case that it is not necessary to encapsulate the diamond bodies in carbon, but rather to merely saturate the molten infiltrant metal in carbon. Thus, any form of carbon in the preform (e.g., particulate) that is available to dissolve and/or react with the molten infiltrant may be helpful in preventing the diamond bodies from being corroded by molten infiltrant metal. This technique could be employed in conjunction with the above-mentioned "siliconizing" process, thereby yielding diamond-containing silicon matrix composites.

Further still, in the absence of a protective coating or precursor coating on the diamond bodies, and in the absence of alloying the infiltrant to suppress corrosion of the diamond bodies, it may be the case that conditions can be selected where the chemical reaction between the diamond bodies and the molten silicon is minimal. For example, useful diamond-containing composite bodies might still be produced where the diamond bodies are relatively large and/or the processing time kept relatively short and/or processing temperature kept low but consistent with reliable infiltration.

Molten silicon or its alloy can infiltrate the porous preform, and the silicon can react with at least a portion (generally only a portion when done correctly) of the non-diamond free carbon matrix of the preform to form at least some SiC in the resulting composite body. This reaction and infiltration typically leaves some residual Si or Si alloy. Often times, the free carbon is at least partially interconnected, which typically results in the in-situ formed SiC being at least partially interconnected. The interconnected SiC generally is thought of as forming a component of the matrix of the composite body. Ideally, the diamond bodies are protected from the molten silicon by the free carbon of the preform, which is generally interconnected. This leaves a composite body featuring as a reinforcement component the diamond bodies, and (optionally) one or more other filler materials, and as a matrix component the SiC and/or Si (or a Si-containing metal) and usually also some residual carbon, mostly at the interface between the reinforcement material(s) and the Si/SiC matrix. The residual carbon coating may also provide for toughening of the composite material by making a weak bond with the Si/SiC matrix, thereby permitting movement of reinforcement bodies relative to the matrix upon application of mechanical stress. The effect is more pronounced for reinforcement bodies that are non-equiaxial, such as platelets or fibers.

Without wishing to be bound to any particular theory or explanation, it may be that the free carbon that embeds, or at least is adjacent to, the diamond bodies can protect the underlying diamond bodies as a result of the large volume change associated with chemically converting carbon to silicon carbide. Upon chemical reaction with silicon, a unit volume of carbon forms 2.3 unit volumes of SiC. The space occupied by the formed SiC can help block off unreacted carbon from further ingress of this molten silicon. In other words, a relatively small amount of reaction of the carbon can help "can off" the infiltration, and thwart continued reaction of carbon by molten silicon. Here, the carbon does not need to be in the "graphitic" form to provide adequate protection from the molten infiltrant.

If necessary or desirable, the diamond bodes of the reinforcement component of the composite body may be supplemented with one or more filler materials. Filler materials are often provided in composite bodies to perform one or more functions such as tailor one or more properties of the composite body in a direction toward that property of the filler material, and/or to minimize the amount of space that must be occupied by matrix material. The filler material(s) could be other forms of carbon not intended to react with the infiltrant to form silicon carbide, other non-elemental carbon-containing materials such as metal carbides, or non-carbon-containing materials such as refractory metals, borides, nitrides or oxides, or complex compounds, e.g., oxycarbides, oxynitrides, borocarbides or boronitrides. As an example, in a RBBC system, the boron carbide particulate is a filler material.

A popular filler morphology is that of particulate because particulate is economical and readily available, but other non-limiting morphologies include fibers, spheres, platelets and flakes. Useful sizes of particulate for metal-ceramic composite bodies made by infiltration of silicon-containing melts range from about 1 micron to about 1 millimeter.

For various reasons, the use of a different particle size distribution in the RBSC preforms may be desired. For instance, coarser particles are less expensive and generally are more suited to achieving a high green density. Also, the use of finer particles, which tends to lead to stronger ceramics, may yield increased ballistic performance against some threats. Moreover, the use of extremely large particles may lead to a macrostructure that can affect the path of a projectile, thus leading to enhanced performance.

Figure 4:
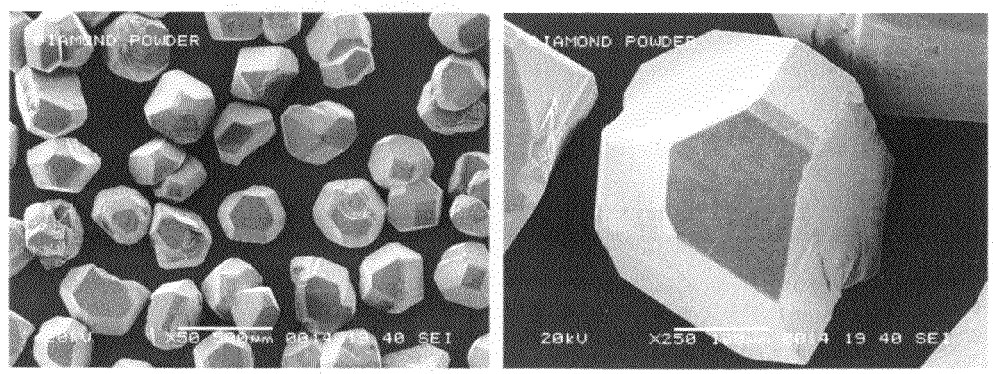
FIG. 4 is a SEM photomicrograph of 300 micron-sized diamond powder for Production of RBSC+7% diamond ceramic.
Figure 5:
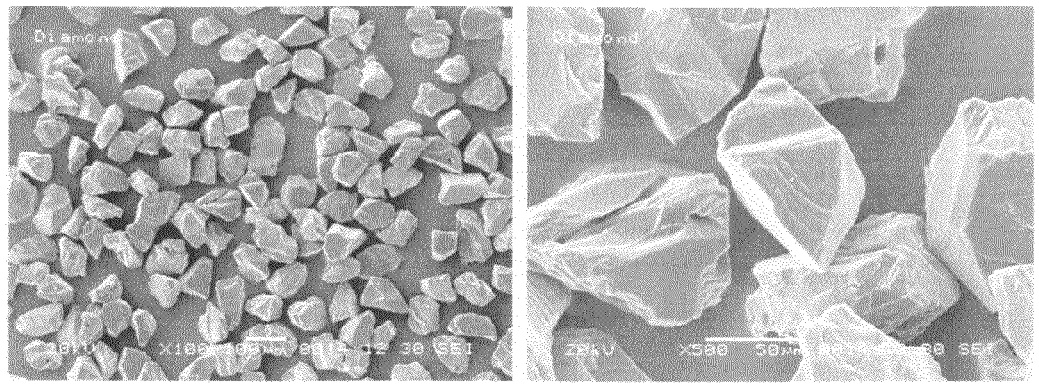
FIG. 5 is a SEM photomicrograph of 76 micron-sized diamond powder for Production of RBSC+7% diamond ceramic.

For the present project, standard 300 and 76 micron cutting tool grade diamond powders were purchased. FIGS. 4 and 5 show SEM photomicrographs of the powders, specifically of powders having mean particle sizes of 300 microns and 76 microns, respectively. The morphology of the individual particles appears faceted, and the overall size distribution is narrow.

As an initial processing step, a small sample of composite material featuring reaction bonded SiC to which 7 weight percent diamond particulate was added at the preform stage was fabricated. The next stage in processing was to produce several 4 inch (100 mm) square tiles of a diamond-containing RBSC composite material. The fabrication of the tiles will be described in greater detail in the Examples to follow.

Results of property measurements and ballistic testing are provided in Table 9. The 310 micron version of RBSC yielded good performance versus the APM2 but only modest performance versus the M993 (see column 1). Thus, the goal of this experimental tile set was to determine if performance versus the M993 round could be increased via the addition of diamond without hurting performance versus the APM2 projectile. Moreover, a material system containing very coarse diamond powders (e.g., 300 micron) minimizes concerns regarding surface reaction with the molten Si infiltration alloy. The 45 micron version of RBSC provided different behavior (see column 3). This ceramic provided "good" performance versus both the APM2 and M993 threats, but in both cases the performance was slightly below goal. Thus, the goal of this experimental set of tiles was to determine if the addition of diamond could provide modest performance increase versus both threats.

As predicted from the data in Table 8, the addition of diamond led to increases in both density and Young's modulus. These increases are a good indication that the diamond survived the processing. The ballistic results versus the APM2 threat are mixed. In the system containing 310 micron SiC particles, where the APM2 performance was already good, the addition of diamond did not change performance. On the other hand, performance versus the APM2 threat increased significantly in the 45 micron SiC system as a result of the diamond addition. Against the M993 threat, performance rose significantly (21%) in both the 310 and 45 micron systems. The performance of the 45 micron RBSC+diamond ceramic is near identical to that for the best commercial ceramic evaluated: —(solid state sintered SiC (see FIGS. 12 and 13). It is postulated that the extremely high bulk modulus of diamond, which is a measure of incompressibility, is leading to the enhancement in performance versus the M993 threat. Incompressible materials will allow dwell to be achieved. With dwell, the projectile can be effectively fractured, thus leaving small fragments for the armor system to easily defeat.

TABLE 9

Property comparison of RBSC without and with 7% diamond inclusions

| | 310 μm RBSC | 310 μm RBSC + 7% Diamond | 45 μm RBSC | 45 μm RBSC + 7% Diamond |
|---|---|---|---|---|
| Diamond Size (micron) | — | 300 | — | 76 |
| Density (g/cc) | 3.15 | 3.18 | 3.12 | 3.15 |
| Young's Modulus (GPa) | 432 | 471 | 407 | 455 |

TABLE 9-continued

Property comparison of RBSC without and with 7% diamond inclusions

|  | 310 μm RBSC | 310 μm RBSC + 7% Diamond | 45 μm RBSC | 45 μm RBSC + 7% Diamond |
|---|---|---|---|---|
| APM2 $V_{50}$ (ft/sec) | 3261 | 3222 | 2941 | >3414 (no CPs) |
| M993 $V_{50}$ (ft/sec) | 2233 | 2703 | 2746 | 3330 |

Figure 6:
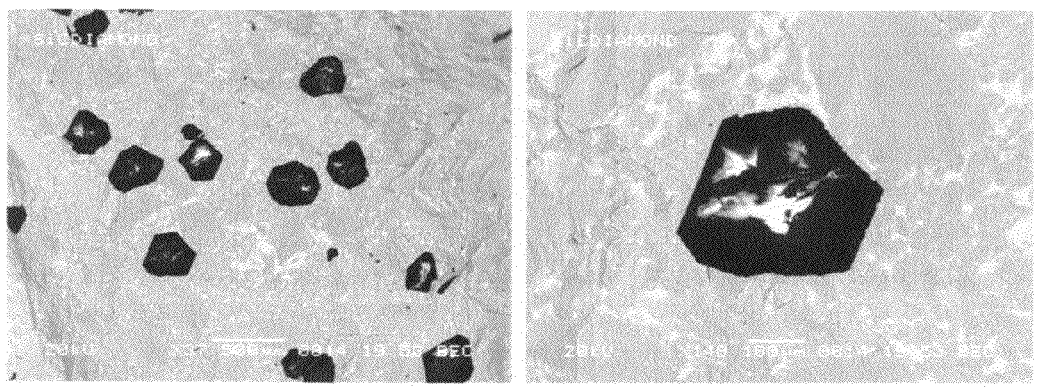
FIG. 6 is a fracture surface of a RBSC ceramic based on 310-micron-sized SiC particles, with a 7% addition of 300-micron-sized diamond particulate.
Figure 7:
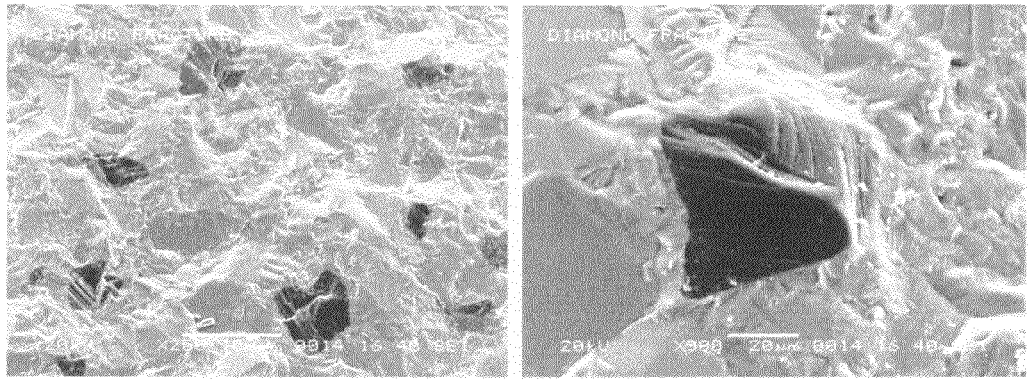
FIG. 7 is a fracture surface of a RBSC ceramic based on 45-micron-sized SiC particulate, with a 7% addition of 76-micron-sized diamond particulate.
Figure 12:
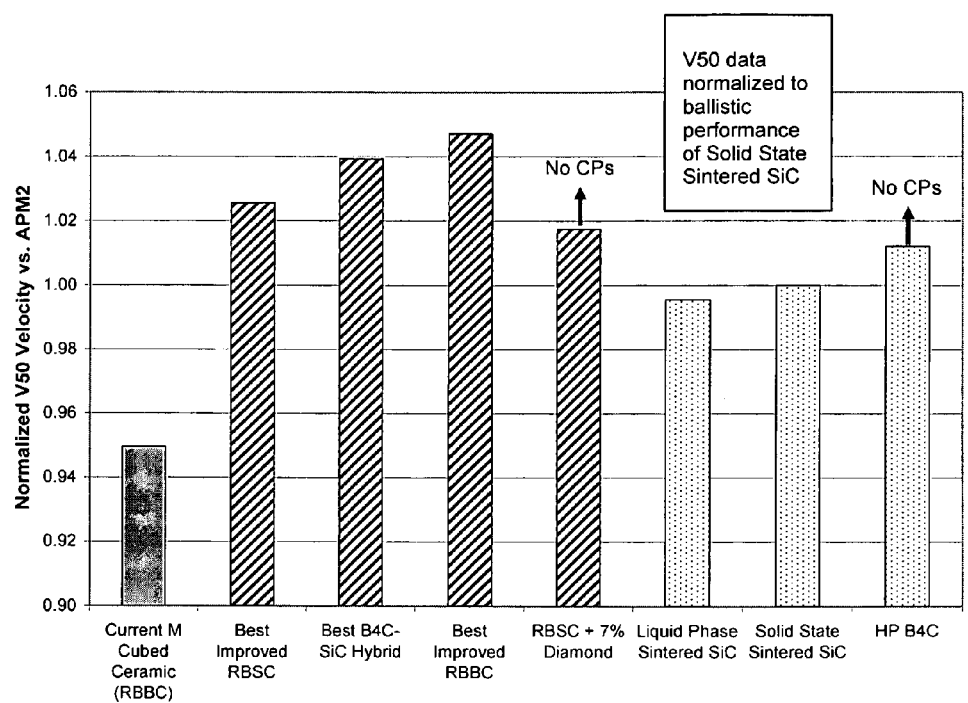
FIG. 12 is an overview of $V_{50}$ ballistic results versus the APM2 projectile
Figure 13:
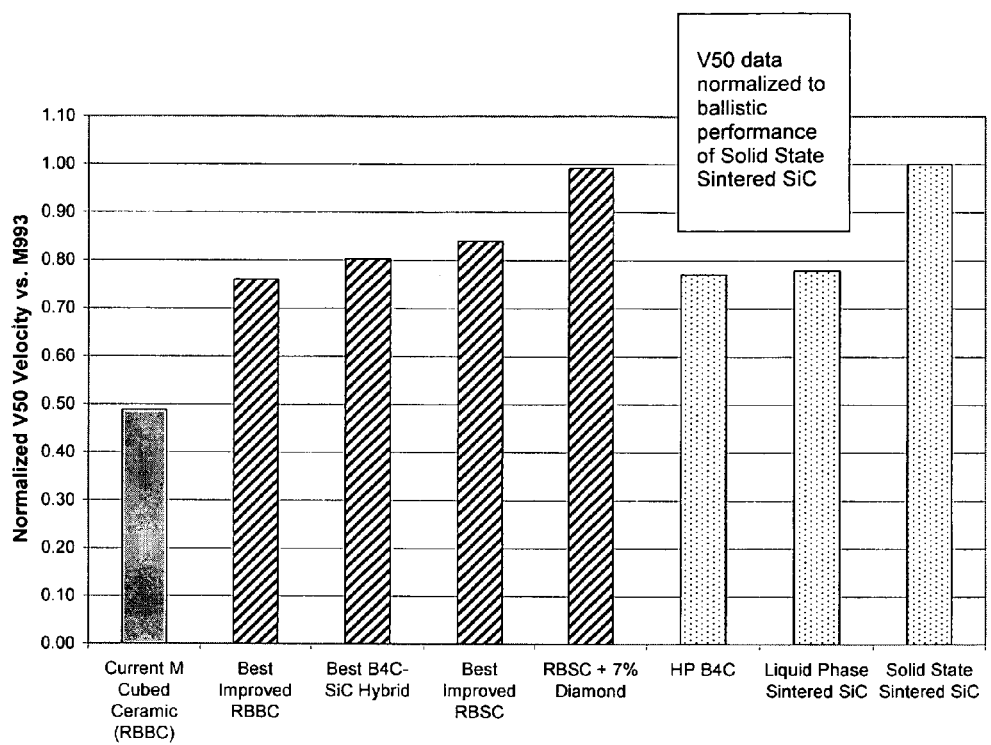
FIG. 13 is an overview of $V_{50}$ ballistic results versus the M993 projectile

Fracture surfaces of the RBSC ceramics containing 300 and 76 micron-sized diamond particles are provided in FIGS. 6 and 7, respectively. In both cases, the diamond has clearly survived the process with little surface reaction with the Si/SiC matrix. In addition, the failures are trans-granular (i.e., the diamond particles fracture on the plane of the crack propagating through the Si/SiC matrix, rather than pulling out of the matrix). Based on the benchmarking work with commercial ceramics, some ballistic data for which is shown in FIGS. 12 and 13, trans-granular failure is desired for ballistic performance, particularly versus the M993 threat.

In summary, the results obtained with diamond reinforced RBSC ceramics are extremely encouraging. It was demonstrated in two RBSC systems (containing 310 and 45 micron diameter SiC particles, respectively) that diamond particles could be incorporated without unwanted Si/diamond reactions. Moreover, properties (e.g., Young's modulus) and ballistic performance were increased. Of particular interest is the dramatic increase in ballistic performance versus the M993 threat. Clearly, one or more attributes of diamond (hardness, stiffness, incompressibility, etc.) plays a major role in the defeat of the ultra-hard and high density WC/Co core of a ballistic projectile.

The following examples illustrate with still more specificity several embodiments of the present invention. Some of the examples also provide details as to the production of the baseline (i.e., non-diamond-containing) materials, and these examples are identified as not constituting the present invention. All of the examples are meant to be illustrative in nature and should not be construed as limiting the scope of the invention.

Example 1

Not the Present Invention

This example demonstrates, among other important features of the instant invention, the fabrication of a silicon carbide composite armor plate highly loaded in a fine-grained silicon carbide filler.

An armor "breastplate" and four "feeder rail" preforms were prepared by a sedimentation casting process. Specifically, about 24 parts of de-ionized water were added to 100 parts of CRYSTOLON green silicon carbide (Saint-Gobain/Norton Industrial Ceramics, Worcester, Mass.) and about 6 parts of KRYSTAR 300 crystalline fructose (A.E. Staley Manufacturing CO., Decatur, Ill.) to make a slurry. The silicon carbide particulate consisted of about 65 parts by weight of Grade F320 (median particle size of about 29 microns, blocky morphology) and the balance Grade 500 RG (median particle size of about 13 microns, rounded morphology). The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant consisting of a 10 weight percent aqueous solution of JOY dishwashing detergent (Proctor and Gamble, Cincinnati, Ohio). The wetted rubber mold was then placed onto the graphite plate and the surfactant was allowed to dry. The slurry was poured into the cavity. Vibration was commenced.

After the particulates had fully settled (about 3 hours), vibration was halted. The residual liquid on the top of the casting was blotted up with a sponge. The graphite plate and the castings in the rubber mold thereon were transferred from the vibration table to a freezer maintained at a temperature of about minus 15° C.

Once the casting had frozen thoroughly, the rubber mold was removed from the freezer and the frozen casting contained therein was demolded and placed onto a graphite setter tray for drying and bisque firing. For the breastplate preforms, a special setter tray was provided, this specific setter tray being contoured to the shape of the outer face of the breastplate preform. The graphite trays and preforms were then placed into a nitrogen atmosphere furnace at ambient temperature. The furnace was energized and programmed to heat to a temperature of about 90° C. at a rate of about 40° C. per hour, then to hold at about 90° C. for about 2 hours, then to further heat to a temperature of about 600° C. at a rate of about 100° C. per hour, to hold at about 600° C. for about 2 hours, then to cool down to about ambient temperature at a rate of about 200° C. per hour. This firing operation pyrolyzed the fructose, yielding a well-bonded preform containing about 2 percent by weight carbon.

The carbon content of the breastplate preform was increased by re-infiltrating with a 70 percent by weight aqueous solution of KRYSTAR 300 crystalline fructose. Specifically, the preform was submerged in the fructose solution for a total of about 20 hours. For about the first 2 hours, an overpressure of about 60 psi (410 kPa) of air was applied to the solution in an effort to force the solution into the preform more quickly. After halting the pressure application for about 15 minutes, it was resumed at the same pressure. After maintaining the overpressure for about another 2 hours, the pressure was let back to ambient and the preform was permitted to soak in the solution for the balance of the 20 hours. The breastplate preform was then removed from the fructose solution and wiped with a damp cloth to remove excess fructose solution. The preform was then re-pyrolyzed according to the same thermal schedule as described above. The second pyrolysis step added about 3 percent to the overall mass of the preform.

The breastplate preform had a mass of about 700 grams and had overall dimensions of about 318 mm long by about 241 mm wide by about 4.4 mm thick. The breastplate was slightly curved in the length and width dimensions. The approximate shape of the breastplate is shown in FIG. 8B. Each rail preform measured about 220 mm long by about 15 mm wide by about 25 mm thick. During infiltration of the breastplate preforms, these rails would serve as a conduit for conducting molten infiltrant toward and into the armor breastplate preform.

A lay-up for infiltration was then prepared.

Figure 8A:
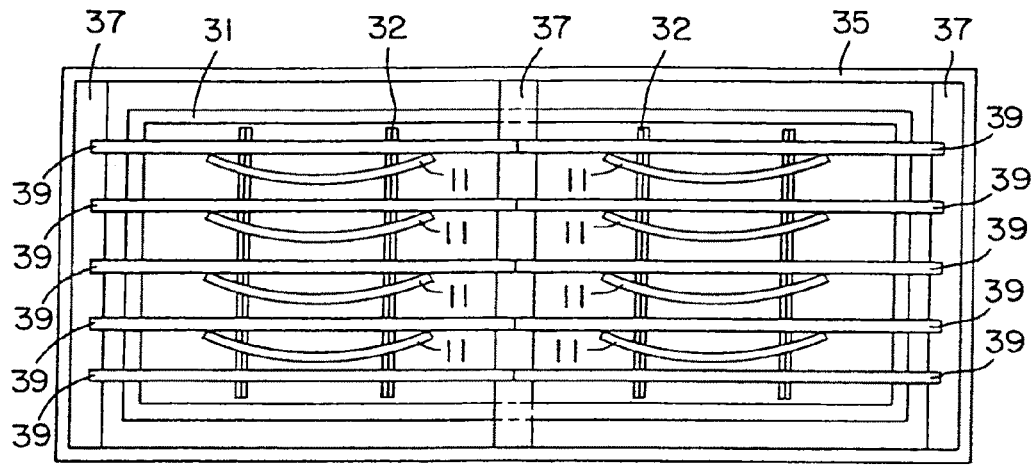
FIGS. 8A and 8B are top and front views, respectively, of a set-up used to prepare silicon carbide composite breastplates according to Example 1.
Figure 8B:
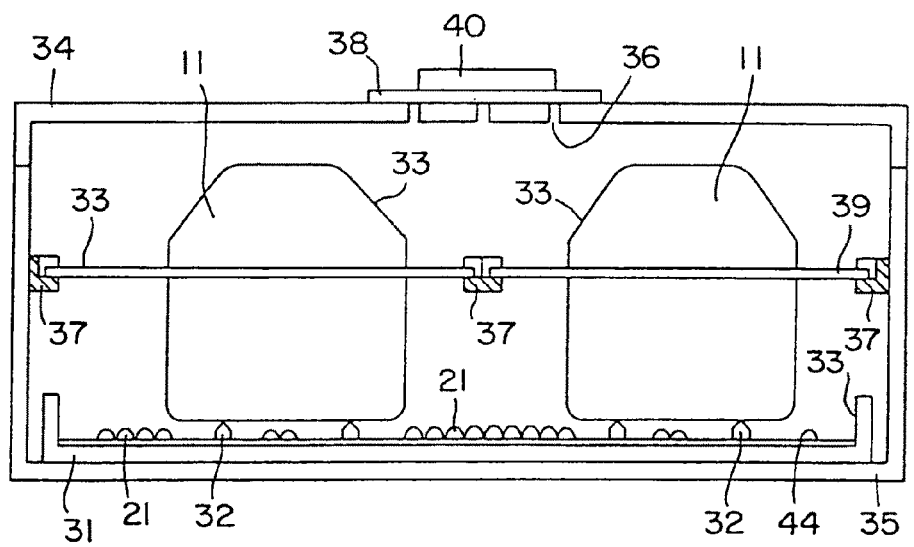

Referring to FIGS. 8A and 8B, the interior surfaces of a Grade ATJ graphite tray 31 (Union Carbide Corp., Carbon Products Div., Cleveland, Ohio) measuring about 790 mm by about 230 mm by about 51 mm deep was spray coated with a boron nitride slurry or paint 33 using a Model 95 Binks spray gun. The boron nitride paint was prepared by diluting about 1800 grams of LUBRICOAT boron nitride paste (ZYP Coatings, Oak Ridge, Tenn.) with deionized water to a volume of about 1 gallon (3.7 liters). Two relatively light coats of this boron nitride paint were applied, with air-drying between coats (20 minutes minimum at 150° C.).

The boron nitride-coated tray was then placed into a larger graphite chamber 35 measuring just slightly larger lengthwise and widthwise than the tray, but being of sufficient height to accommodate the long dimension of the armor breastplate. The chamber also featured means 37 for supporting a parallel array of graphite dowel rods 39.

Infiltration of the Carbon Cloth and Silicon Carbide Feeder Rails

Referring now specifically to FIG. 8B, a single PANEX® 30 low oxidation carbon cloth 44 (Grade PW03, plain weave, 115 g/m², Zoltek Corp., St. Louis, Mo.) weighing about 25 grams and measuring about 790 mm by about 230 mm was placed on the floor of the coated graphite tray 31,33. Four silicon carbide rail preforms 32, each having a mass of about 190 grams, were placed across the width of the cloth 44, and arranged in pairs, one pair on each half of the tray. Silicon (Grade LP, Elkem Metals Co., Pittsburgh, Pa., lump form) comprising by weight about 0.5 percent Fe (max) and the balance Si, was spread over the surface of the carbon cloth in a sufficient amount to ensure complete infiltration of the cloth, rails and any preform resting on the rails. The top of the chamber was covered with a loose-fitting (non-hermetically sealing) graphite lid 34 featuring a number of 1 cm diameter through-holes 36 to permit atmosphere exchange. The holes were covered with a piece of graphite felt 38 which was held in place with a graphite block 40 which served as a dead load, thereby completing the lay-up.

The completed lay-up was then placed into a vacuum furnace at about ambient temperature (e.g., about 20° C.). The air was evacuated using a mechanical roughing pump, and a rough vacuum of less than about 100 millitorr residual pressure was thereafter maintained. The lay-up was then heated from ambient temperature to a temperature of about 1350° C. at a rate of about 200° C. per hour. After maintaining a temperature of about 1350° C. for about 1 hour, the temperature was further increased to a temperature of about 1550° C. at a rate of about 200° C. per hour. After maintaining a temperature of about 1550° C. for about 1.5 hours, the temperature was decreased to a temperature of about 1450° C. at a rate of about 100° C. per hour. Without holding at this temperature, the lay-up temperature was further decreased to a temperature of about 1300° C. at a rate of about 25° C. per hour, which was immediately followed by a cooling at a rate of about 200° C. per hour to approximately ambient temperature.

Following this heating schedule, the chamber and its contents were recovered from the vacuum furnace. The silicon infiltrant had melted and infiltrated through the carbon cloth and the rail preforms, thereby converting the carbon cloth to silicon carbide cloth, and forming dense, silicon carbide composite feeder rails. From gravimetric analysis, it was determined that there was about 770 grams of uninfiltrated silicon remaining pooled on the silicon carbide cloth. The contents of the graphite chamber were then re-used to fabricate silicon carbide composite armor breastplates.

Infiltration of Breastplate Preforms

About another 1775 grams of silicon 21 (Grade LP, Elkem Metals Co., Pittsburgh, Pa.) and comprising by weight about 0.5 percent Fe (max) and the balance Si, was distributed on the silicon carbide fabric between the silicon carbide composite (e.g., infiltrated) rails. Graphite dowel rods 39 measuring about 0.25 inch (6 mm) in diameter and spray coated with boron nitride paint 33 as described above were placed into graphite holders or supports 37. Four breastplate preforms 11 similarly spray coated with boron nitride 33 were placed across the two rails edgewise in each half of the tray (see FIG. 8A). The surface of each preform contacting the rails was left uncoated. The top of the chamber was covered as previously described to complete the lay-up.

The graphite chamber and its contents were then thermally processed in substantially the same manner as was used to infiltrate the carbon cloth and silicon carbide feeder rail preforms.

Following this heating schedule, the graphite chamber and its contents was recovered from the vacuum furnace and disassembled. The silicon infiltrant had melted, infiltrated through the composite feeder rails and into the armor breastplate preforms to form dense, silicon carbide composite breastplates. Because each breastplate was supported by the rails in line contact on its width dimension, only light hand-applied force was required to separate the formed breastplate composite bodies from the feeder rails. Only a light sand-blasting was required to remove several nodules of silicon infiltrant that had exuded through certain points in the boron nitride coating on the breastplates.

Example 2

Not the Present Invention

Eight silicon carbide composite armor breastplates were formed in substantially the same manner as in Example 1, with the following exceptions. First, about 22 parts by weight of deionized water was added to about 6 parts of KRYSTAR crystalline fructose (A.E. Staley Mfg. Co.) and about 100 parts of CRYSTOLON green silicon carbide particulate (Saint-Gobain/Norton Industrial Ceramics, Worcester, Mass.). Second, the silicon carbide particulate consisted by weight of about 60 percent Grade F240 (median particle size of about 45 microns, blocky morphology) and the balance Grade 500 RG (median particle size of about 13 microns, rounded morphology).

Example 3

Not the Present Invention

Figure 9:
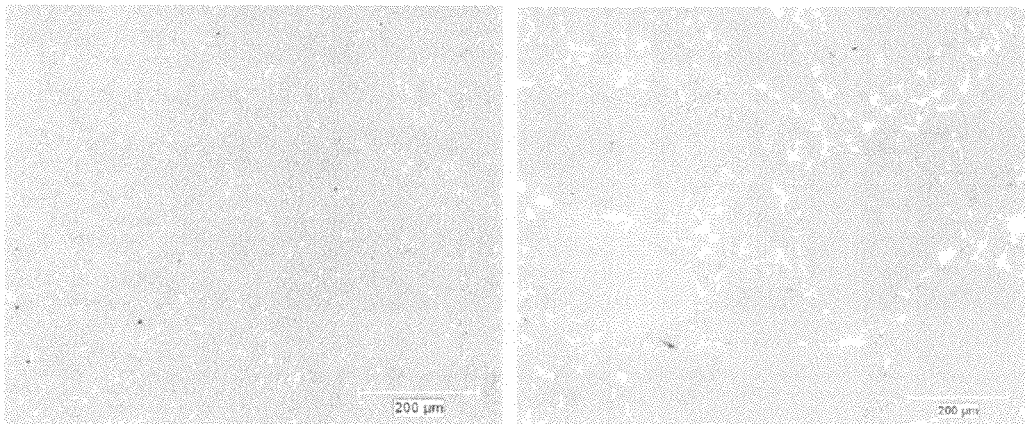
FIG. 9 is a pair of optical photomicrographs of RBSC ceramics with different particle size distributions of the SiC filler: Left: standard 45 micron version; Right: experimental 310 micron version.

A 310 micron blended composite was formulated that has a much higher modulus and lower final silicon content than the composites based on 45-micron SiC powder. A comparison of the tap pack density (an indicator of powder packing) is listed in Table 10 and the microstructures in FIG. 9 show the size variation of the 310-micron particles as compared to the standard 45 micron system.

TABLE 10

Packing Comparison of New Powder Formulation

| Preform Designation | Particle distribution (wt %) | Tap Pack Density (g/cc) |
|---|---|---|
| Standard - 45 μm | 60% 240 grit - 40% 500 grit | 2.18 |
| High packing - 310 μm | 55% 54 grit - 36% 240 grit - 9% 800 grit | 2.40 |

As the size of these large particles increases, they transition from being part of the matrix to becoming an inclusion surrounded by the matrix. The primary function of the particle changes as this transition occurs, from a packing constituent to a toughening component.

Example 4

As an initial processing step, a small RBSC+7% diamond composite sample was fabricated. The aim was to confirm that the diamond could be protected and to determine density. Based on optical examination of a fracture surface, the diamond was shown to have survived. Moreover, based on the density result, net shape molds for 100 mm×100 mm tiles were produced (grinding thicker tiles of this composite to the desired areal density is not an option).

Two sets of 100 mm×100 mm test tiles were then fabricated:

310 micron (54 grit) version of RBSC+7 wt. % 300 micron diamond 45 micron (240 grit) version of RBSC+7 wt. % 76 micron diamond A slurry that could be sedimentation cast was prepared by roll mixing the slurry constituents. Specifically, for every 100 grams of silicon carbide and diamond particulate, about 15.6 grams of phenolic resin (SC1008 from Borden Chemical Inc., Louisville, Ky.) and 40 grams of reagent grade alcohol were added. The resulting slurry was roll mixed for about 12 hours.

After roll mixing for about 12 hours, the mixture was poured out of the jar and into a rubber mold of nominal cavity size about 100 mm square by about 13 mm deep. The rubber mold was placed on a vibrating table for about 18 hours, during which time, the excess liquid pooled at the top, and it was periodically removed. The mold was placed in an oven and the temperature was raised to about 140° C. at a rate of about 10° C. per hour, with about two 2-3 hour holds for temperature equilibration. After holding at about 140° C. for about 3 hours, the oven and its contents were cooled at about 200° C. per hour to ambient temperature. The preform was then demolded and placed on a graphite plate and was then placed in an inert atmosphere retort. The temperature was raised above 650° C., held for about 2 hours and reduced to room temperature to carbonize the preform.

After carbonizing, the preform was dipped in the phenolic for 2 hours to back soak it. The back soaked preform was placed in an inert atmosphere retort and the temperature was raised above 600° C., held for 1 hour and then reduced to room temperature, to further carbonize the preform.

The preform was then placed in a graphite boat along with chunks of silicon. The boat was placed in a vacuum furnace. The furnace was evacuated below 100 microns pressure. The temperature of the furnace was raised to about 1450° C. and held for 1 hour. The temperature was then reduced to room temperature. As a result of this thermal processing, the silicon had melted and wicked into the preform, forming a composite.

Example 5

This Example demonstrates the production of a RBSC composite containing diamond particles. The example furthermore demonstrates a system that protects the diamond particles during processing.

A porous preform for silicon infiltration was prepared as follows. About 10 g of SiC (500 grit, Saint Gobain) was mixed with about 2 g of synthetic diamond particulate (DMI) having a grain size of about 500 microns in a beaker using a spatula. About 1 g of phenolic resin (Borden Chemical) was added and the mixture was further mixed. About half the mixture was poured into a ⅞ inch (22 mm) diameter dry pressing die. The die was placed into a hydraulic press and pressed to a load of about 20,000 pounds (about 9100 kg force). The demolded preform was about 0.25 inch (about 6 mm) thick.

Two such preforms were then carbonized by placing them into an inert atmosphere retort and heating to about 600 C. After maintaining this temperature for about 1 hour, the retort and its contents were cooled, and the carbonized preforms were transferred to a graphite boat, and placed into contact with about 20 g of silicon metal. The boat was placed into a vacuum furnace, and vacuum drawn. The furnace and its contents were heated to about 1483 C, held at that temperature for about 2 hours, and then cooled to about ambient temperature.

The preforms recovered from the furnace were found to be infiltrated to yield reaction bonded composite bodies. After cleaning by grit blasting, densities were measured, and samples were cut, mounted and polished for ceramography. The densities were about 2.94 and 2.91 g/cc, respectively. The parts were fully dense; that is, free of porosity.

Figure 10:
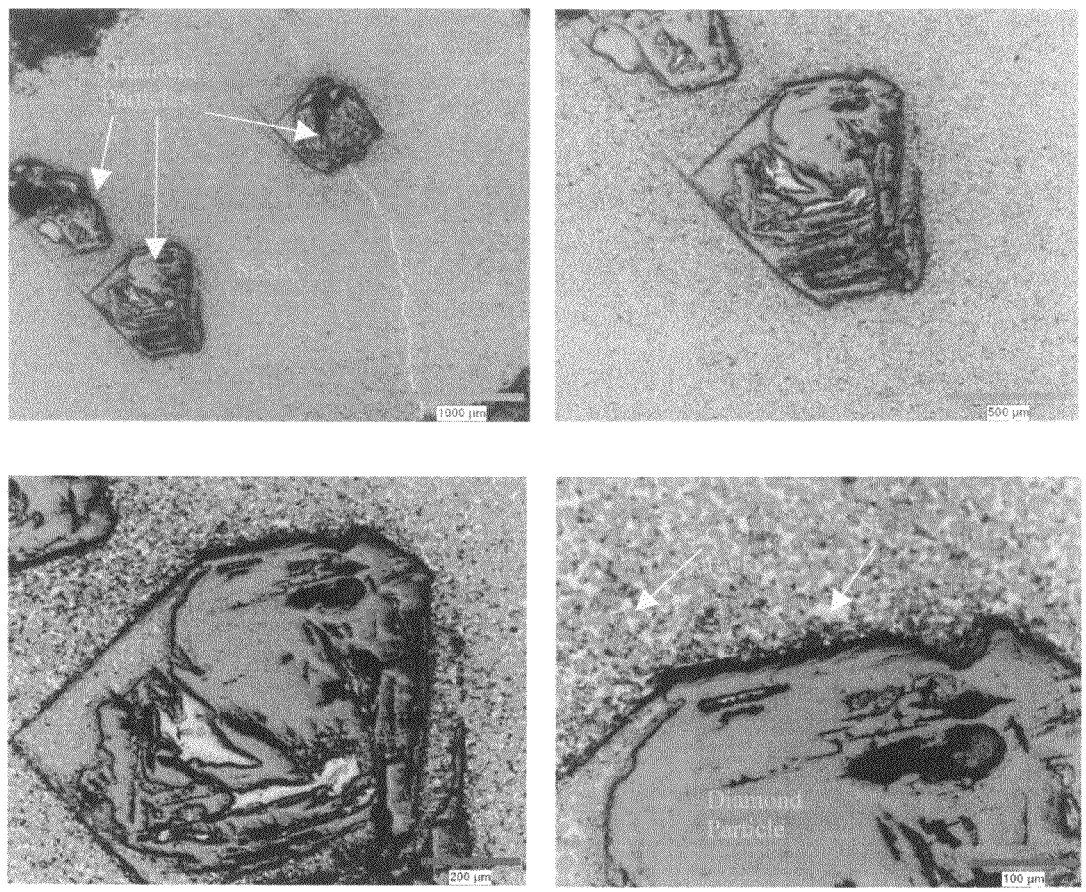
FIG. 10 is a set of optical photomicrographs of the diamond-containing RBSC composite at various magnifications.
Figure 11:
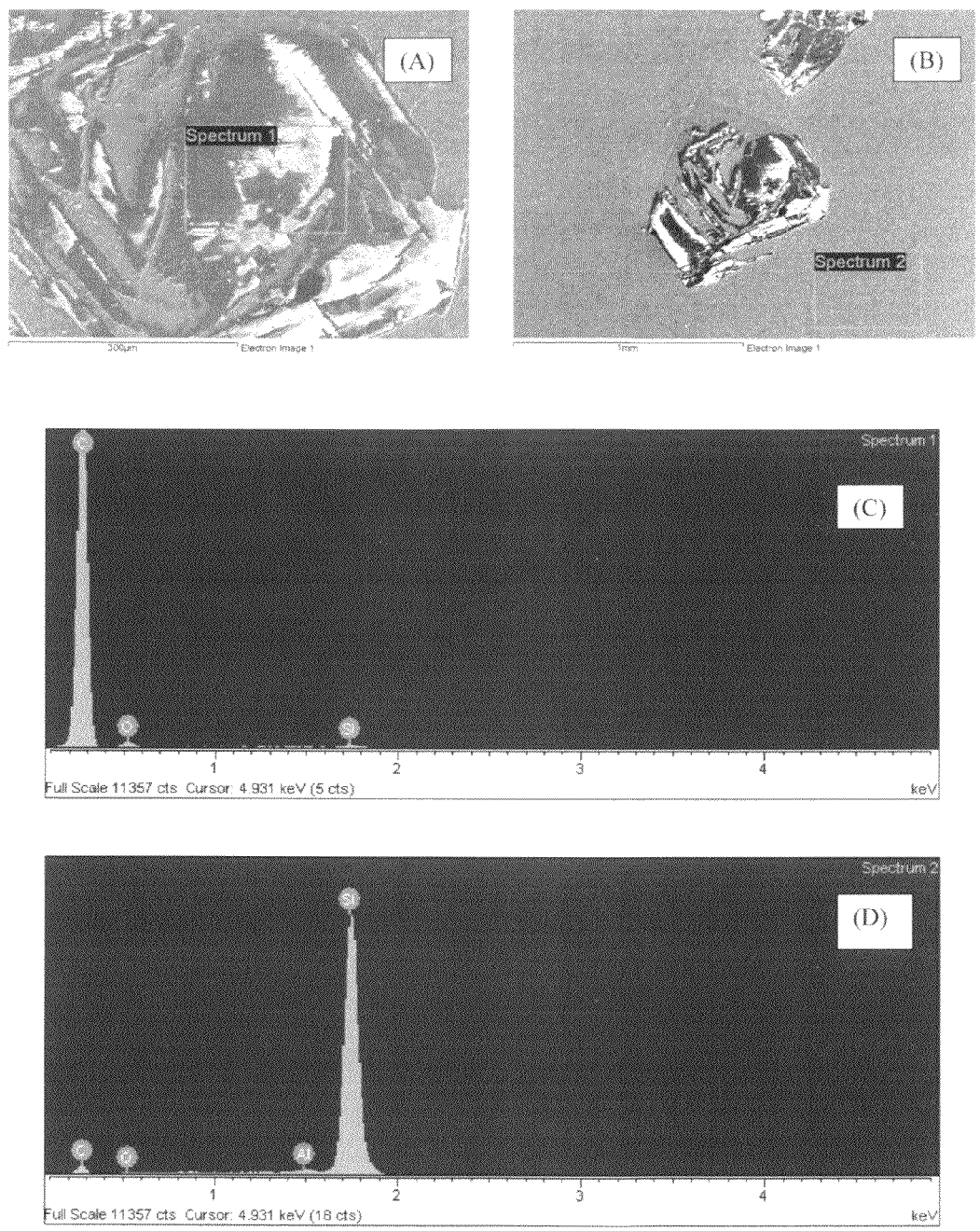
FIGS. 11A and 11B show SEM photographs identifying the two different regions corresponding to the EDAX spectra shown in FIGS. 11C and 11D.

FIG. 10 shows optical micrographs from one of the specimens at various magnifications. Several diamond particles can be seen embedded in the Si—SiC composite in the lower magnification micrographs. In the highest magnification micrograph, individual SiC particles and the silicon matrix can be seen along with part of a diamond particle Scanning electron microscopy (SEM) and energy dispersive analysis of X-rays (EDAX) were performed on this sample to determine the elemental composition of two different regions. FIGS. 11A and 11B show SEM photographs identifying the two different regions from which the electron beam obtained material composition data for the EDAX analysis. The spectra obtained from these analysis data from the two regions are shown in FIGS. 11C and 11D. The Spectrum 1 from the region inside the diamond particle only shows carbon as the major element with very minor amounts of oxygen and silicon. The Spectrum 2 from the Si—SiC composite region on the other hand, shows silicon as the majority element and carbon as an additional element (from the SiC). In the presence of silicon, many of the carbon X-rays are absorbed and thus do not reach the detector. Therefore, even for stoichiometric SiC, the percentage of carbon appears much lower than it actually is. Nevertheless, the key finding here is that the diamond particle does not show any silicon and thus, was well protected from the molten silicon during the reaction bonding process.

Although boron carbide is not the optimum armor material for heavier threats, as discussed above, there are several applications, such as an armor for use against tool steel-based (or softer) small arms fire, where boron carbide composites are desirable. Since many of the processing conditions for making diamond-containing RBSC are the same or similar to those for making reaction bonded boron carbide (RBBC), it should be possible to make a diamond-containing RBBC composite. The boron carbide can replace some or all of the silicon carbide. The processing temperature should not exceed 2000 C, and preferably not 1550 C, and perhaps not even 1450 C. To minimize or eliminate chemical reaction of the silicon metal with the boron carbide, the surface area of the boron carbide bodies should be kept to a minimum, for example, by using the largest sized boron carbide bodies as possible. Adding a source of boron to the silicon, and preferably saturating the silicon with the boron source, also helps to suppress chemical reaction.

The discussion to this point has focused on diamond-containing composites that are of homogeneous or of uniform composition. However, functionally gradient composites are known, and it should be possible to prepare functionally gradient diamond composites. For example, it should be possible to prepare preforms that are functionally gradient in at least the diamond constituent.

Furthermore, the discussion to this point has assumed that the diamond-containing component of an armor body interacts with the incoming projectile; that is, that the projectile impacts diamond-containing material. However, due to the extreme properties offered by diamond (e.g, modulus and thermal conductivity), there may be value in providing a diamond-containing armor body where the diamond component is partially or exclusively in a zone or region where it does not directly interact with the impinging projectile, but perhaps serves another function such as property tailoring or matching.

SUMMARY AND CONCLUSIONS

The goal of the research program for the federal Government was to develop a high performance, durable, low cost, manufacturable personnel armor tile for defeat of AP threats (cores of tool steel and WC/Co). The development of diamond-reinforced SiC ceramics were a part of this program.

The addition of diamond to the RBSC microstructure greatly enhances properties (hardness, Young's modulus). Moreover, significant increases in ballistic performance can be achieved, particularly versus the M993 threat. RBSC ceramics with 7% diamond were shown to offer ballistic performance levels that matched the best commercial ceramics tested on the program. An overview of ballistic results obtained on the program is provided in FIGS. 12 and 13. In particular, FIG. 12 reports ballistic data against the APM2 tool steel projectile, and FIG. 13 shows ballistic performance against the M993 WC/Co—cored projectile. Data in these figures include the performance of M Cubed Technologies' current reaction bonded $B_4C$ (RBBC) ceramic, results for improved reaction bonded ceramics developed on the present program, and results for state-of-the-art traditional ceramics, e.g., hot pressed boron carbide and sintered silicon carbide.

INDUSTRIAL APPLICABILITY

The diamond-reinforced composite materials of the instant invention, possessing the desirable properties of low specific gravity and high hardness, should be particularly useful against small arms fire, e.g., as body armor, and as aircraft armor. The instant diamond-containing armors have shown greater resistance to pressure-induced phase transformations than composite armor materials containing boron carbide or large amounts of elemental silicon. As such, they might also find application in marine vessels and ground-based vehicles, e.g., for armor protection against heavier threats. The diamond-reinforced composite materials of the instant invention may also have utility as wear-resistant components or as cutting tools. Further, these materials have low CTE and high stiffness, and may therefore find application in the precision equipment industries such as metrology and semiconductor equipment fabrication, e.g., lithography. Moreover, the diamond component can contribute significantly to thermal conductivity.

One or more embodiments of the instant invention may feature the following characteristics or attributes, but not necessarily in a single embodiment:

a lightweight composite material that has utility as armor against ballistic projectiles a ballistic armor body that exhibits minimal dimensional change during processing a ballistic armor as a monolithic or unitary body having a large and possibly complex shape a ballistic armor that exhibits good ballistic performance under high pressure ballistic impact a ballistic armor that exhibits good ballistic performance against hard ballistic projectiles such as those containing hardened steel or cemented carbide (e.g., WC/Co)

a ballistic armor that exhibits good multi-hit capability

An artisan of ordinary skill will appreciate that various modifications may be made to the invention herein described without departing from the scope of the invention as defined in the appended claims.

REFERENCES

1. D. J. Viechnicki, M. J. Slavin and M. L. Kliman, "Development and Current Status of Armor Ceramics," *Ceramic Bulletin*, 70, No. 6 (1991) 1035-9.
2. V. Dominich and Y. Gogotsi, "Phase Transformation in Silicon Under Contact Loading," *Rev. Adv. Mater. Sci.*, 3 (2002) 1-36.
3. M. Chen, J. McCauley and K. Hemker, "Shock-Induced Localized Amorphization in Boron Carbide," *Science*, 299 (2003) 1563-6.
4. P. Hazell, S. Donoghue, C. Roberson and P. Gotts, "The Penetration of Armour Piercing Projectiles Through Reaction Bonded Ceramics," *Ceramic Eng and Sci. Proc.—$29^{th}$ International Conference on Advanced Ceramics and Composites—Issue 7, Advanced in Ceramic Armor*, J. Swab ed., 26 (2005) 143-50.
5. M. K. Aghajanian, B. N. Morgan, J. R. Singh, J. Mears, R. A. Wolffe, "A New Family of Reaction Bonded Ceramics for Armor Applications", in Ceramic Armor Materials by Design, *Ceramic Transactions*, 134, J. W. McCauley et al. editors, 527-40 (2002).
6. P. G. Karandikar, M. K. Aghajanian and B. N. Morgan, "Complex, Net-Shape Ceramic Composite Components for Structural, Lithography, Mirror and Armor Applications, *Ceram. Eng. Sci. Proc.*, 24 (2003) in-press.
7. D. G. Munz, J. L. Shannon and R. T. Bubsey, "Fracture Toughness Calculations from Maximum Load in Four Point Bend Tests of Chevron Notch Specimens", *Int. J. Fracture*, 16 R137-41 (1980).
8. J. J. Swab, "Recommendations for Determining Hardness of Armor Ceramics", *Int. J. Appl. Ceram. Tech.*, 1 [3] 219-25 (2004).
9. *Metals Handbook: Desk Addition* (ASM International, Metals Park, Ohio, 1985).
10. *Engineered Materials Handbook, Vol. 4, Ceramics and Glasses*, (ASM International, Metals Park, Ohio, 1991).
11. NIST Structural Ceramics Database (SCD), Citation No. Z00225.
12. H. Sumiya and T. Irifune, Indentation Hardness of Nano-Polycrystalline Diamond Prepared from Graphite by Direct Conversion", *Diamond and Related Materials*, 13 [10] 1717-1776 (2004).

What is claimed is:

1. An article useful for protection against a ballistic projectile, comprising:
   (a) a tile having a strike face for impact of a ballistic projectile, and a rear face;
   (b) a fiber-reinforced backing comprising a face opposing the rear face of the tile, and bonded thereto, said tile comprising diamond particulate distributed through a matrix comprising silicon carbide, wherein said matrix further comprises elemental silicon.

2. An article useful for protection against a ballistic projectile, comprising:
(a) a tile having a strike face for impact of a ballistic projectile, and a rear face;
(b) a fiber-reinforced polymer backing comprising a face opposing the rear face of the tile, and bonded thereto, said tile comprising diamond particulate distributed through a matrix comprising silicon carbide, wherein said tile further comprises at least one substantially inert filler material also distributed through said matrix, and further wherein said substantially inert filler material comprises at least one material selected from the group consisting of titanium diboride and aluminum nitride.

3. An article useful for protection against a ballistic projectile, comprising:
(a) a tile having a strike face for impact of a ballistic projectile, and a rear face;
(b) a fiber-reinforced polymer backing comprising a face opposing the rear face of the tile, and bonded thereto, said tile comprising diamond particulate distributed through a matrix comprising silicon carbide, wherein said diamond particulate makes up from about 0.1 percent by volume to about 25 percent by volume of said tile.

4. An article useful for protection against a ballistic projectile, comprising:
(a) a tile having a strike face for impact of a ballistic projectile, and a rear face;
(b) a fiber-reinforced polymer backing comprising a face opposing the rear face of the tile, and bonded thereto, said tile comprising
(i) a matrix comprising silicon carbide;
(ii) diamond particulate distributed through said matrix; and
(iii) elemental carbon other than said diamond particulate, wherein said elemental carbon encapsulates said diamond particulate.

5. The article of claim 4, wherein said matrix further comprises elemental silicon.

6. The article of claim 4, wherein said tile further comprises at least one substantially inert filler material also distributed through said matrix.

7. The article of claim 6, wherein said substantially inert filler material comprises at least one material selected from the group consisting of silicon carbide and silicon nitride.

8. The article of claim 4, wherein said diamond particulate makes up from about 0.1 percent by volume to about 25 percent by volume of said tile.

9. The article of claim 4, wherein said diamond particulate is substantially homogeneously distributed throughout said tile.

* * * * *